United States Patent [19]
Taylor et al.

[11] Patent Number: 4,888,689
[45] Date of Patent: Dec. 19, 1989

[54] APPARATUS AND METHOD FOR IMPROVING CACHE ACCESS THROUGHPUT IN PIPELINED PROCESSORS

[75] Inventors: Michael D. Taylor; Robert M. Maier; Michael J. Begley, all of San Jose; Allan J. Zmyslowski, Sunnyvale; Jeffrey A. Thomas, Cupertino; Joseph A. Petolino, Palo Alto, all of Calif.

[73] Assignee: Amdahl Corporation, Sunnyvale, Calif.

[21] Appl. No.: 920,805

[22] Filed: Oct. 17, 1986

[51] Int. Cl.⁴ ............................................. G06F 13/14
[52] U.S. Cl. ..................................... 364/200; 364/900
[58] Field of Search ... 364/200 MS File, 900 MS File, 364/300

[56] References Cited

U.S. PATENT DOCUMENTS

| | | | |
|---|---|---|---|
| 3,949,379 | 4/1976 | Ball | 364/200 |
| 4,110,822 | 8/1978 | Porter et al. | 364/200 |
| 4,187,770 | 2/1980 | Gannon et al. | 364/200 |
| 4,189,768 | 2/1980 | Liptay et al. | 364/200 |
| 4,200,927 | 4/1980 | Hughes et al. | 364/200 |
| 4,287,561 | 9/1981 | Liptay | 364/200 |
| 4,392,200 | 7/1983 | Arulpragasam | 364/200 |
| 4,583,165 | 4/1986 | Rosenfeld | 364/200 |
| 4,594,655 | 6/1986 | Hao et al. | 364/200 |
| 4,594,659 | 6/1986 | Guenthner et al. | 364/200 |
| 4,608,633 | 8/1986 | Boothroyd et al. | 364/200 |
| 4,644,466 | 2/1987 | Saito | 364/200 |
| 4,658,355 | 4/1987 | Hatakeyama et al. | 364/736 |
| 4,685,058 | 8/1987 | Lee et al. | 364/200 |
| 4,713,752 | 12/1987 | Tone | 364/200 |
| 4,719,570 | 1/1988 | Kawabe | 364/200 |
| 4,722,046 | 1/1988 | Kasrazadeh et al. | 364/200 |
| 4,727,484 | 2/1988 | Saito | 364/200 |
| 4,733,344 | 3/1988 | Watanabe et al. | 364/200 |
| 4,739,470 | 4/1988 | Wada et al. | 364/200 |
| 4,740,112 | 6/1988 | Jones et al. | 364/200 |
| 4,758,949 | 7/1988 | Wada et al. | 364/200 |
| 4,777,594 | 10/1988 | Jones et al. | 364/200 |

Primary Examiner—Andrew J. James
Assistant Examiner—Viet Q. Nguyen
Attorney, Agent, or Firm—Fliesler, Dubb, Meyer & Lovejoy

[57] ABSTRACT

An apparatus and method for use in improving cache storage unit utilization during an interlock of an instruction pipeline generates a control signal during one cycle of the interlock if the interlocked instruction may require storage unit management work. In response to the control signal, selector control logic in the storage unit generates a priority signal indicating the interlocked instruction for selection by the storage unit for processing. In response to the control signal and the priority signal, the cache management logic is used during the interlock on the interlocked instruction to prepare for supplying needed data when the interlock is released.

16 Claims, 4 Drawing Sheets

APPARATUS AND METHOD FOR IMPROVING CACHE ACCESS THROUGHPUT IN PIPELINED PROCESSORS

CROSS-REFERENCE TO RELATED APPLICATION

The present invention is related to U.S. patent application entitled CACHE STORAGE QUEUE, Ser. No. 06/900,640, filed Aug. 27, 1986, invented by Daberkow et al., which is owned now and at the time of invention by a common assignee.

FIELD OF THE INVENTION

The present invention relates to high speed data processing machines that process instructions in pipeline or queue fashion. In particular, the present invention provides for increasing the throughput of cache accesses in situations involving pipeline or queue interlock.

BACKGROUND OF THE INVENTION

A central processing unit of a data processing machine typically consists of three logical units: an instruction unit, a storage unit and an execution unit. The instruction unit fetches instructions from storage, decodes the instructions, generates addresses for operands and specifies the operations by generating execution unit opcodes to be performed by the execution unit. The storage unit maintains a cache for instructions and operands, retrieves instructions from either the cache or a main storage facility in response to instruction unit requests and supplies operands to the execution unit. Further, the storage unit stores results supplied by the execution unit into the cache. The execution unit performs an operation specified by the execution opcodes generated upon decoding of the instruction, and generates results for supply back to either the instruction unit or the storage unit.

The central processing unit is typically implemented in a pipeline manner. For instance, the system in which the present invention is implemented includes a five-stage pipeline processor. The five stages are:

(1) D-Cycle

The instruction to be executed is decoded by the instruction unit.

(2) A-Cycle

The addresses of operands for the instruction are generated by the instruction unit and passed to the storage unit.

(3) B-Cycle

The operands are fetched from either instruction unit general purpose registers or the storage unit cache.

(4) X-Cycle(s)

The execution opcodes corresponding to the operation specified by the instruction are executed. More than one X-Cycle may be necessary depending on the complexity of the execution operation.

(5) W-Cycle

The result of the instruction is supplied to the storage unit for storage in the cache or to the instruction unit for storage in general purpose registers.

When no interlocks exist in the pipeline and only one X-Cycle is required for execution of the execution opcode, the pipeline flows evenly with an execution opcode delivered to the execution unit in the A-Cycle, the operand or operands delivered in the B-Cycle, the execution opcode executed in the X-Cycle and the result returned in the W-Cycle.

If the execution unit requires multiple X-cycles to execute the execution opcode, the pipeline interlocks until the operation is completed. Under these conditions, the instruction unit may deliver the execution opcode for the following instruction to the execution unit in the B-Cycle rather than the A-Cycle.

If the storage unit is unable to deliver an operand within one B-Cycle, such as when the data required for the operand is not resident in the cache, the execution unit waits in the X-Cycle until the operand is available.

The storage unit typically operates according to a separate pipeline from the instruction unit pipeline, or a queue, that is designed to make the most efficient use of storage unit resources without impacting the flow of the instruction unit pipe. When the storage unit is unable to deliver an operand within one B-Cycle of the instruction unit pipe, then the address for the operand is loaded into fetch ports in the storage unit and the data is retrieved from the main storage system, or other storage unit resources are utilized to make the data available. When the data becomes available through the cache, the address is read from the fetch port through the storage unit pipeline and supplied to the instruction unit. When the operand is received by the instruction unit, the instruction unit pipe is freed from the interlock and continues processing.

It is desirable that the storage unit pipeline be utilized in a manner that minimizes the effect of interlocks in the instruction unit pipe which occur due to storage unit accesses. The fetch ports accomplish this goal to a certain degree by shortening the length of interlocks caused by the storage unit. However, it is desirable to further increase instruction unit pipeline throughput by reducing the number of interlocks caused by storage unit accesses, as well as the length of the interlocks.

SUMMARY OF THE INVENTION

The present invention operates in a data processing system that includes an instruction unit, a main store storing data and other resources, and a storage unit having a high speed cache storing a subset of the data and other resources retrieved from the main store. The instruction unit includes a first register in the pipeline that receives instructions including address information and is subject to interlocks in which an interlocked instruction held in the first register is prevented from advancing in the pipeline during one or more cycles. The storage unit includes a plurality of ports holding address information for access to the cache in a queue or pipeline fashion. In addition, storage unit management logic manages the cache access, fetches data from the cache in response to selected address information and retrieves data or other needed resources from the main store or other source. A selector is coupled to receive the address information from the first register in the instruction unit and from the plurality of ports to the storage unit, and provides the address information from one of those sources for use by the cache management logic in response to priority signals. Selector control logic generates the priority signals to control storage unit utilization.

In one aspect, the present invention is an apparatus for use in improving storage unit utilization during an interlock of the instruction unit that comprises a means coupled to the first register for generating a control signal during one cycle of an interlock if the interlocked instruction may require storage unit management work. In addition, means responsive to the control signal and coupled to the selector control logic is provided for generating a priority signal indicating the first register for selection by the selector. Finally, means, responsive to the control signal and the priority signal, is included for signalling the cache management logic that it is being used during an interlock on an interlocked instruction.

Thus, according to the present invention, the cache management logic in the storage unit is utilized during an interlock caused by a preceding instruction to perform such work as retrieving data required by the interlocked instruction from the main store or preparing translation information for the address needed by the interlocked instruction. Therefore, storage unit work that could cause additional interlocks of the instruction unit pipeline is accomplished in the background of preceding interlocks. Overall instruction unit pipeline throughput is therefore increased.

DETAILED DESCRIPTION

Figure 1:
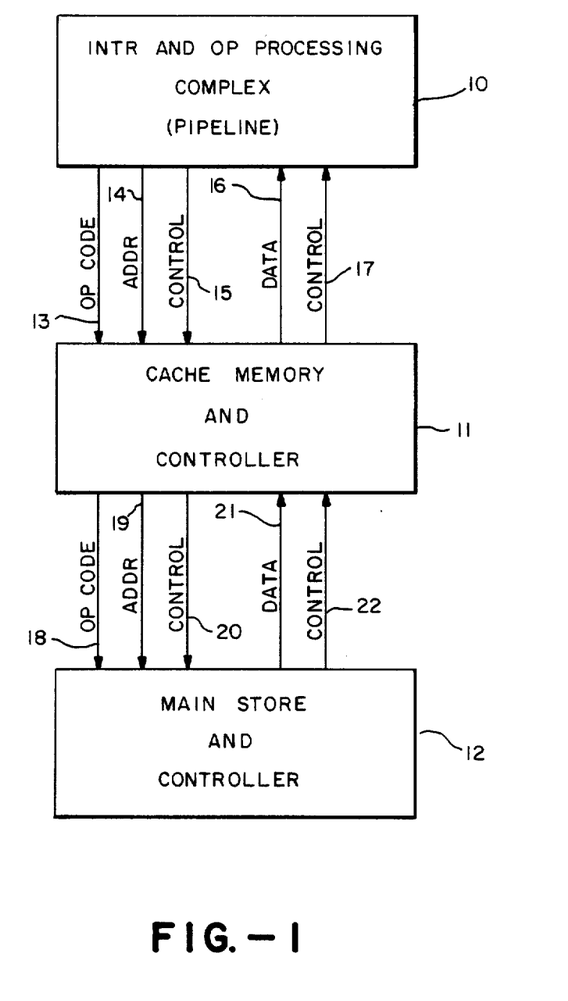
FIG. 1 shows an overview block diagram system implementing the present invention.
Figure 2A:
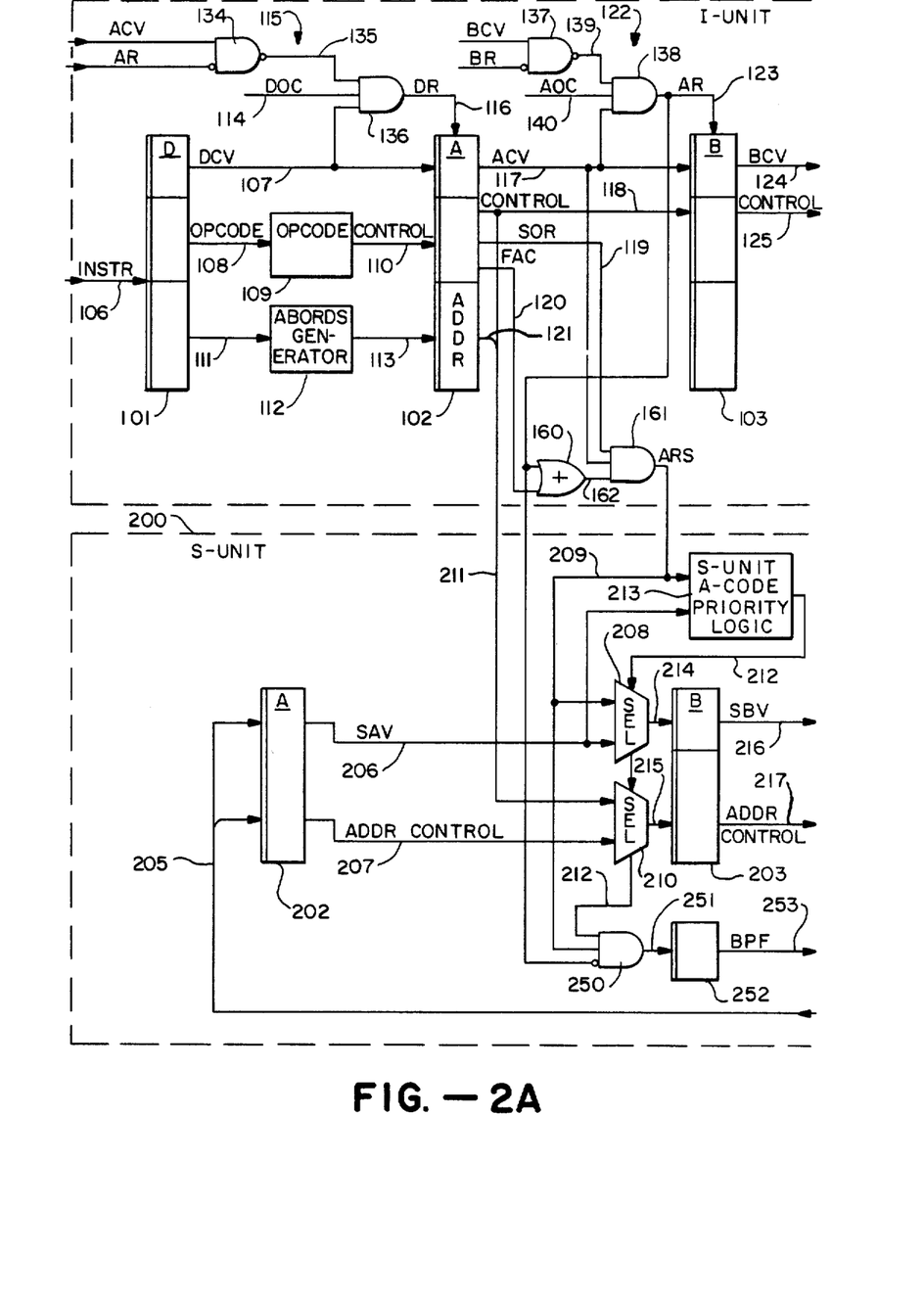
FIGS. 2A and 2B show a preferred implementation of the present invention in more detail.
Figure 2B:
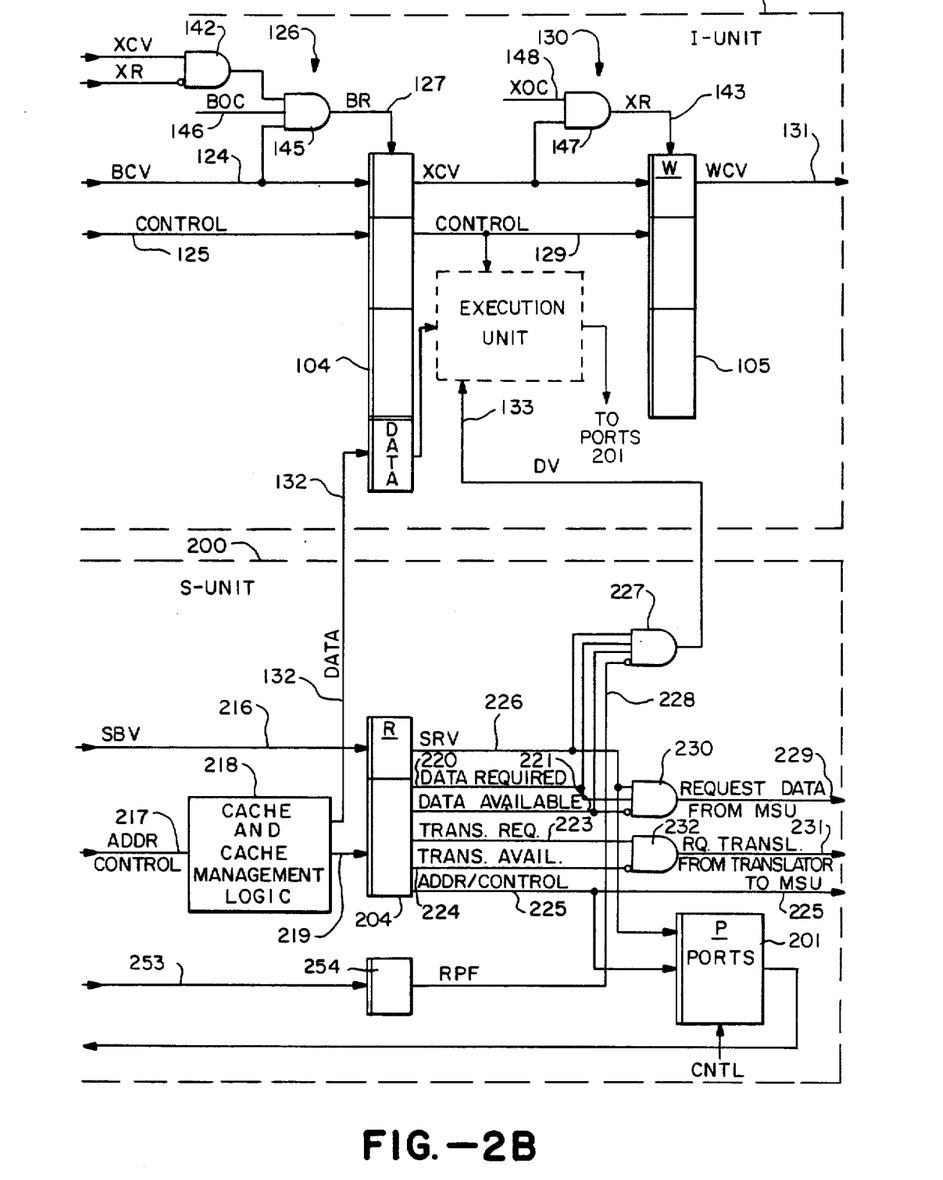

With reference to FIGS. 1, 2A and 2B, a preferred implementation of the present invention is provided.

FIG. 1 is a block diagram of the data processing system that includes instruction and operand processing complex 10, a cache memory and controller 11, and a main store and controller 12. The instruction and operand processing complex 10, operates according to a pipeline which may consist of the five stages described in the background of the invention.

The cache memory and controller 11 stores a subset of data retrieved from the main store and controller 12, and other resources such as translations.

The main store and controller 12 stores system data and other resources. The cache memory and controller 11 forwards opcodes, addresses and control information across lines 18, 19 and 20, respectively, to the main store and controller 12. The main store and controller 12 returns data or other resources and addresses across lines 21 and 22, respectively, to the cache memory and controller 11.

In interfacing with the cache memory and controller 11, the instruction and operand processing complex 10 makes requests for data including an opcode on line 13, an address on line 14, and associated control information on line 15 to the cache memory and controller 11 during the A-Cycle of the pipeline, and data is returned across line 16 to the instruction and operand processing complex 11, along with associated control information across line 17 during the X-Cycle. If data is not available when the instruction and operand processing complex 10 reaches the X-Cycle, the pipeline interlocks waiting for the data from the cache memory and controller 11 as illustrated in Table 1.

TABLE 1

| | | | | | | | | | | | |
|---|---|---|---|---|---|---|---|---|---|---|---|
| First Flow  | D | A | B | X | X | X | . | . | . | X | W |
| Second Flow |   | D | A | B | B | B | . | . | . | B | X | W |
| Third Flow  |   |   | D | A | A | A | . | . | . | A | B | X |

TABLE 1-continued

| | | | | | | | | | |
|---|---|---|---|---|---|---|---|---|---|
| Fourth Flow |   |   |   | D | D | D | . | . | . | D | A | B |

Table 1 illustrates four flows of the pipeline, each flow representing the path of the single instruction through the instruction and operand complex 10. The first flow requests data during its A-Cycle from the cache memory and controller 11, proceeds through the B-Cycle and interlocks in the X-Cycle waiting for the data to be returned by the cache memory and controller 11. At some subsequent X-Cycle, the interlock is released and the first flow proceeds with its W-Cycle.

The second flow encounters the interlock caused by the unavailable data for the first flow in its B-Cycle after having already made a request, if any, to the cache memory and controller 11 during its A-Cycle. Because the second flow has already made its request to the cache memory and controller 11, the address information and control necessary for a cache memory access can be stored in a fetch port in the cache memory and controller unit 11 to await the release of the interlock.

The third flow encounters the interlock during its A-Cycle. As yet it has not communicated the address and related control information to the cache memory and controller 11 that is necessary for a cache access.

The fourth flow encounters the interlock during its D-Cycle, before the address information has been decoded to a form that can be utilized by the cache memory and controller 11 for a cache access.

It is possible that the data required by the second flow or the third flow is unavailable in the cache and the data or other resources required to make the data available will have to be retrieved from the main store and controller 12, causing an additional interlock in the pipeline after the first interlock is released.

The present invention provides a mechanism for beginning main memory accesses for a request which is interlocked in its A-Cycle when the data to be requested by the operation is not initially in the cache or not in the cache in an accessible form. This decreases the cache miss penalty for the request interlocked in the A-cycle and therefore increases pipeline throughput.

The present invention comprises a means in the instruction and operand processing complex 10 for generating a special request for cache resource access when an instruction is interlocked in the A-cycle due to delay caused by preceding instruction The special request is termed a prefetch request.

The cache memory and controller unit 11, includes means responsive to the prefetch request for checking the cache for the presence of the data being requested by the instruction interlocked in the A-Cycle, or for the existence of a valid address translation or other resources needed for accessing the data and initiating a move-in request for data from the main store and controller system 12 if a miss is detected, or other resources needed to assure a successful cache access when the interlock is released. For these prefetch requests, data is not actually returned to the requesting unit by the cache memory and controller 11 and fetch ports are not utilized to generate the request. When the interlock causing the request to stall in the A-Cycle goes away, the instruction and operand processing complex 10 will regenerate the data request from the A-Cycle which will then be processed in a normal fashion by the cache memory and controller 11.

Table 2 shows two cases in pipeline flow diagram form that illustrate the difference between a design without the prefetch request feature of the present invention and one which incorporates it. Case shows four flows in which the first and third flows request data not available in the cache at the time it is requested. Case 2 shows the same four flows in a system having the prefetch feature of the present invention.

of FIGS. 2A and 2B a storage unit pipeline is illustrated designated the S-Unit 200. The I-Unit 100 corresponds to the instruction and operand processing complex 10 of FIG. 1 and the S-Unit 200 corresponds to the cache memory and controller 11 of FIG. 1.

In the instruction unit 100, a five-cycle pipeline such as described in the Background of the Invention, is implemented, having a D-Cycle register 101, an A-

TABLE 2

| CASE 1: No prefetch | | | | | | | | | | | | |
|---|---|---|---|---|---|---|---|---|---|---|---|---|
| D | A | B X X | ... | X | W | | | | | | | |
|   | D | A B B | ... | B | X | W | | | | | | |
|   |   | D A A | ... | A | B | X | X | ... | X | W | | |
|   |   | D D | ... | D | A | B | B | B ... | B | X | W | |
| +—R—+ | | | +—D—+ | | | | | | | | |
|   | +—R—+ | | | +—D—+ | | | | | | +—D—+ | |
|   |   | +—R—+ | | | | | | | | | +—D—+ |
|   |   |   | +—R—+ | | | | | | | | |

| CASE 2: Miss-ahead prefetch incorporated | | | | | | | | | | |
|---|---|---|---|---|---|---|---|---|---|---|
| D | A | B | X | X ... | X | W | | | | |
|   | D | A | B | B ... | B | X | W | | | |
|   |   | D | A | A ... | A | B | X | W | | |
|   |   |   | D | D ... | D | A | B | X | W | |
| +—R—+ | | | | +—D—+ | | | | | | |
|   | +—R—+ | | | +—D—+ | | | | | | |
|   |   | +—P—+ | | +—R—+ | | +—D—+ | | | | |
|   |   |   |   | +—R—+ | | | +—D—+ | | | |

In Table 2, the +—R—+ designates the cycle in which a request is made by the instruction and operand processing complex 10 to the cache memory and controller 11 for data. The requests are always made in the A-Cycle of the instruction and operand processing pipeline. The +—D—+ illustrates the time in which valid data is returned to the instruction and operand processing complex 10 by the cache memory and controller 11. After the data is returned, the instruction and operand processing complex 10 proceeds from its X-Cycle to its W-Cycle for the requesting instruction.

In systems having two fetch ports in the cache memory and controller 11, the same diagram as shown in Case 1 would appear even if the second flow required data not present in the cache at the time it is requested, because the cache memory and controller 11 is able to process both storage unit requests delivered to the fetch ports in the cache memory and controller 11. The fetch ports would hold the instruction causing the interlock in its X-cycle and the instruction waiting its B-Cycle due to the interlock.

The +—P—+ designates the cycle in which a prefetch request is made by the instruction and operand processing complex 10 to the cache memory and controller 11 in Case 2. The +—R—+ in Case 2 represents the normal request for data, and the +—D—+ illustrates the cycle in which valid data is returned to the instruction and operand processing complex 10. Case 2 graphically shows that no delay results from the third flow request for data because the data is moved in from the main store or otherwise made available in parallel with the X-Cycle interlock of flow 1. In an actual occurrence, the third flow may still be delayed in its X-Cycle because data may still not be available in the cache if the interlock is short. However, because the prefetch signal has already begun to process the request, the number of cycles caused by the cache miss will be reduced.

FIGS. 2A and 2B together illustrate a preferred implementation of the present invention. On the top half of FIGS. 2A and 2B an instruction unit pipeline is illustrated, designated the I-Unit 100. Along the bottom half Cycle register 102, a B-Cycle register 103, an X-Cycle register 104, and a W-Cycle register 105. An instruction is received across line 106 from an instruction fetch mechanism or other source that is not important to the present invention. It is latched into the D-Cycle register 101 during the first step of the flow. The D-cycle register supplies a D-cycle command valid signal DCV on line 107. An opcode from the instruction is supplied across line 108 to a decoder 109 which supplies control signals across line 110. Information in the instruction identifying an operand for use by the opcode on line 108 is supplied across line 111 to address generation logic 112. The address generation logic supplies an address across line 121 in a form for access to the S-Unit 200. Upon completion of the functions required during the D-Cycle, a D-Cycle operation complete signal is generated on line 114 by the instruction unit. D-Cycle release logic 115 detects conditions explained below to generate a D-Cycle release signal on line 116 which releases the instruction from the D-Cycle to the A-Cycle.

The A-Cycle register 102 receives the D-Cycle command valid signal on 107, the control on line 110 and the address on line 113 and supplies an A-Cycle command valid signal ACV on line 117, control signals on line 118, a signal indicating that an S-Unit operation is required, SOR, on line 119, a signal indicating that the instruction in the A-Cycle register 102 is in its first A-Cycle, FAC, on line 120, and address information on line 121. When A-Cycle operations are complete, the AOC signal is generated on line 140. The A-Cycle command valid signal, control signals and address information pass down the pipeline to the B-Cycle register 103 in response to the generation of an A-Cycle release signal AR on line 123 by the A-Cycle release logic 122.

A B-Cycle command valid signal BCV is supplied through the B-Cycle register 103 on line 124, the control information is passed on line 125.

Proceeding to FIG. 2B, the B-Cycle command valid signal BCV on line 124 and the control on line 125 are supplied to the R-Cycle register 104. When B-Cycle operations are complete, the BOC signal is generated on line 146. B-Cycle release logic 126 generates a B-Cycle release signal BR on line 127 to clock the X-Cycle register 104 to receive the data. An X-Cycle command valid signal XCV is supplied on line 128 from the X-Cycle register 104 as well as control information on line 129. When X-Cycle operations are complete, a XOC signal is generated on line 148.

A W-Cycle register 105 receives the X-Cycle command valid signal XCV from line 128 and the control from line 129 in response to X-Cycle release logic 130. A W-Cycle command valid signal WCV is supplied by the W-Cycle register 105 on line 131 and so on along the pipe.

The X-Cycle register 104 also includes a section for receiving data across line 132 from the storage unit 200. Further, a data valid signal DV is supplied on line 133 from the storage unit 200 when valid data is supplied to the X-Cycle register 104.

Returning to FIG. 2A, the D-Cycle release logic 115 includes NAND-gate 134 that receives as input the A-Cycle command valid signal ACV from line 117 and the A-Cycle release signal AR from line 123. The A-Cycle release signal AR on line 133 is inverted at an input of gate 134. In addition, AND-gate 136 is included in the D-Cycle release logic receiving as inputs the signal on line 135, the D-Cycle operation complete signal DOC from line 114 and the D-Cycle command valid signal DCV from line 107.

The A-Cycle release logic 122 includes NAND-gate 137 receiving as inputs the B-Cycle command valid signal BCV from line 124 and the inverted B-Cycle release signal BR from line 127. The output of gate 137 is supplied on line 139. AND-gate 138 receives as input the output of gate 137 from line 139, the A-Cycle operation complete AOC signal on line 140 and the A-Cycle command valid signal ACV on line 117, and supplies its output as the A-Cycle release signal AR on line 123.

The B-Cycle release logic on line 126 shown in FIG. 2B includes NAND-gate 142 which receives the X-Cycle command valid signal XCV from line 128, the X-Cycle release signal XR from line 143 as inputs and supplies a signal on line 144. In addition, the B-Cycle release logic 126 includes AND-gate 145 receiving the signal from line 144, B-Cycle operation complete signal BOC on line 146 and the B-Cycle command valid signal BCV from line 124 as inputs. The output of gate 145 is the B-release signal BR on line 127.

The X-Cycle release signal on line 143 is supplied as output from AND-gate 147 which receives as inputs the X-Cycle operation complete signal XOC on line 148 and the X-Cycle command valid signal XCV from line 128.

The S-Unit 200 operates in a four-stage pipeline with cycles P-A-B-R. The P-Cycle refers to the cycle in which address information for a flow of the storage unit pipe is latched into ports 201. A detailed description of ports in the preferred embodiment can be found in the above-referenced U.S. patent application entitled CACHE STORAGE QUEUE.

The next cycle of the storage unit pipeline is an A-Cycle followed by the B- and R-Cycles. Thus a storage unit includes an A-Cycle register 202, a B-Cycle register 203, and an R-Cycle register 204. During the A-Cycle, an address and control information is loaded from the ports 201 across line 205 to A-Cycle register 202. The A-Cycle register 202 supplies an S-Unit A-Cycle valid signal SAV across line 206. Address and control information is supplied across line 207 from the A-Cycle register 202.

A control signal selector 208 is included which receives as inputs the SAV signal across line 206 and an A-Cycle request for storage signal ARS across line 209. An address and control selector 210 receives the address and control information across line 207 and address and control information from lines 118 and 121 in the I-Unit 100 across line 211.

The selectors 208 and 210 are controlled by a priority signal on line 212 from S-Unit A-Cycle priority logic 213. The inputs to the S-Unit A-Cycle priority logic 213 include the S-Unit A-Cycle valid signal SAV on line 206 and the A-Cycle request for storage unit signal ARS on line 209.

The priority logic 213 in the preferred embodiment always assigns highest priority to I-Unit 100 requests indicated by the ARS signal. Other priority schemes can be implemented as known in the art. The B-Cycle register latches a selected control signal from selector 208 on line 214 and the selected address and control information from selector 210 on line 215.

Out of the B-Cycle register 203 is supplied an S-Unit B-Cycle valid signal SBV on line 216 and address and control information on line 217. The address and control information on line 217 is supplied as shown in FIG. 2B to the cache and cache management logic 218. The S-Unit B-Cycle valid signal SBV on line 216 is supplied to the X-Cycle register 204. The cache and cache management logic 218, in response to the address and control information from line 217, retrieves data from the cache if available, and supplies it on line 132 to the instruction unit. In addition, cache control signals are generated by the cache management logic supplied to the X-Cycle register 204 across line 219. The X-Cycle register 204 latches the control signals including the "data required" signal on line 220, the "data available" signal on line 221, a "translation required" signal on line 223, a "translation available" signal on line 224 and address and control information on line 225. In addition, an S-Unit R-Cycle valid signal SRV is supplied on line 226.

The data valid signal DV on line 133 is supplied from AND-gate 227 which receives as inputs the S-Unit R-Cycle valid signal SRV from line 226, the "data required" signal from line 220, and the "data available" signal from line 221. In addition, gate 227 is enabled or disabled by a staged prefetch request signal on line 228, described below with regard to the prefetch request hardware.

If data required to be fetched from the main storage unit because it is not present in the cache, a request data from main storage unit signal is generated by AND-gate 230 on line 229. Gate 230 receives as inputs the S-Unit R-Cycle valid signal SRV on line 226, the "data required" signal on line 220, and the inverse of the "data available" signal on line 221. Thus, if data is required and not available for a valid request, the data is requested from the main storage unit. The address and control information is supplied on line 225 to the main storage unit.

In addition, the cache management logic 218 may require other resources to make the data in the cache available for use by the I-Unit 100. For instance, a valid translation of a virtual address must be available in the cache management logic before valid data can be supplied. Thus the control signals "translation required" and "translation available" are generated. If translation resources are required then a signal on line 231 is generated by AND-gate 232. The inputs to gate 232 include the S-Unit R-Cycle valid signal SRV on line 226, the "translation required" signal on line 223 and the inverse of the "translation available" signal on line 224. In the preferred embodiment, the "data available" signal is not generated in the S-Unit 200 if a translation is required but not available.

The present invention in the embodiment shown in FIGS. 2A and 2B is characterized by the generation of the FAC signal on line 120 indicating the occurrence of the first A-Cycle of an instruction in the pipeline. The FAC signal is generated by staging the D-Cycle release signal DR from line 116 by one cycle. If an interlock occurs, the D-Cycle release signal DR will go low and the FAC signal will go low one cycle later creating a pulse in the first A-Cycle for each instruction going through the pipeline on line 120.

The FAC signal is supplied as one input to OR-gate 160. The second input to OR-gate 160 is A-Cycle release signal AR from line 123. The A-Cycle request for storage unit resources ARS on line 209 is generated in AND-gate 161 which receives the output of OR-gate 160 across line 162 as one input, the A-Cycle command valid signal ACV from line 117 as a second input, and the storage unit operation requested signal SOR from line 119 out of the A-Cycle register 102. The S-Unit A-Cycle priority logic 213 responds to an A-Cycle request for storage unit ARS on line 209 by assigning priority to the A-Cycle register 102 in the instruction unit for selection by the selectors 208 and 210 into the S-Unit B-Cycle register 203.

With the generation of the FAC signal and the use of the OR-gate 160, the A-Cycle request for storage unit signal ARS on line 209 is generated at two instances during the A-Cycle of an instruction in the instruction unit pipeline. In particular, this occurs during the first A-Cycle as indicated by the FAC signal on line 120 and when the A-Cycle is released as indicated by the A-Cycle release signal AR on line 123. For instructions that are not interlocked, these signals will occur during the same system cycle.

For instructions that are interlocked, the FAC signal results in generation of an A-Cycle request for storage unit ARS on line 209 during the first cycle of the interlock and the A-Cycle release signal AR on line 123 results in the generation of an A-Cycle request for storage unit ARS during the last cycle of the interlock.

A prefetch condition is signalled by AND-gate 250 in the storage unit 200. Gate 250 receives as inputs the priority signal from line 212 out of the S-Unit A-Cycle priority logic 213, the A-Cycle request for storage unit ARS on line 209, and the inverse of the A-Cycle release signal AR on line 123.

The output of the gate 250 on line 251 is latched in a B-Cycle prefetch latch 252. The output indicates that the A-Cycle request for storage unit signal ARS has been generated during the first cycle of the interlock as indicated by the inverse of the A-Cycle release signal AR on line 123 and the A-Cycle request for storage unit ARS on line 209. In addition, the signal on line 212 indicates that the prefetch condition was the highest priority condition according to the S-Unit A-Cycle priority logic 213 and resulted in the selection of the address and control information from the A-Cycle register 102 in the I-Unit 100.

The B-Cycle prefetch signal from latch 252 staged on line 253 to the R-Cycle prefetch register 254 is shown in FIG. 2B. The output of the R-Cycle prefetch register is supplied on line 228 as an input to the AND-gate 227.

During a prefetch condition, the R-Cycle prefetch signal on line 228 is true which disables the gate 227 from supplying the data valid signal on line 133 to the instruction unit. Thus, the instruction unit 100 will not acknowledge any data supplied on line 132 from the cache due to the selection of the prefetch address and control information through the storage unit pipeline. Requests are made to the main storage unit based on these prefetch requests (see Gate 230).

Figure 3:
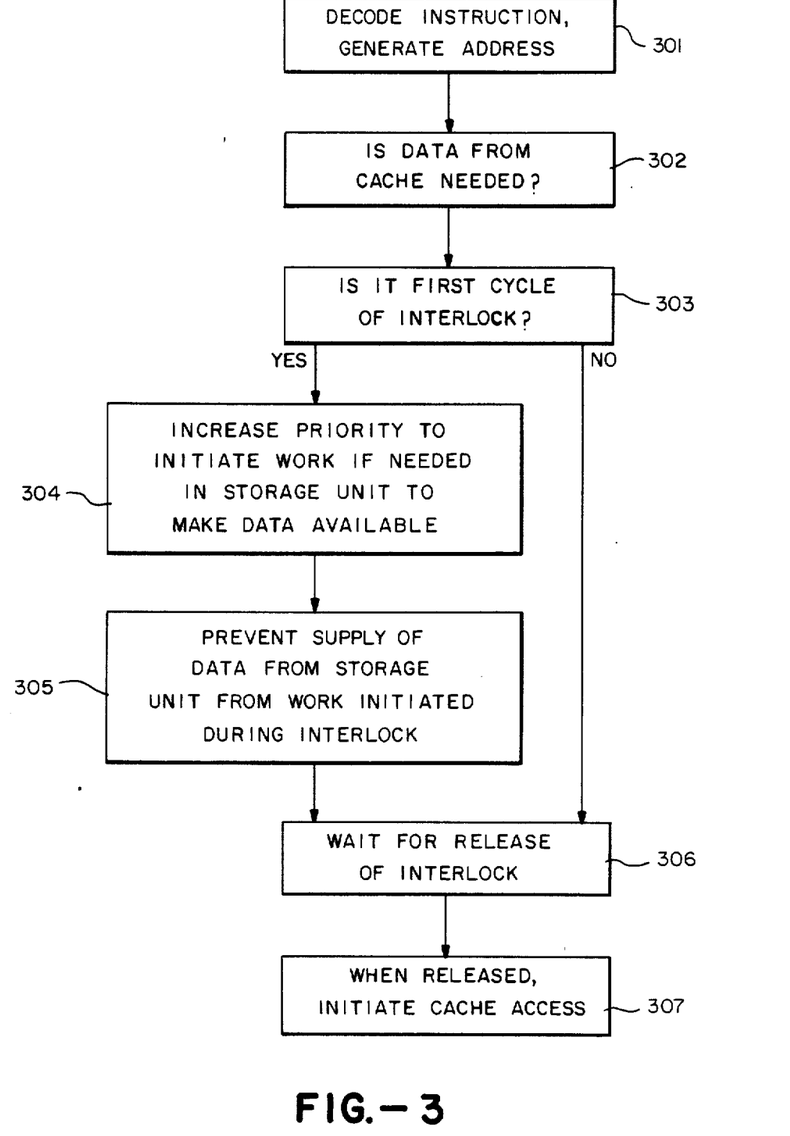
FIG. 3 shows a flowchart illustrating a method according to the present invention.

FIG. 3 is a flow chart illustrating a method according to the present invention. The first step of the method is to decode the instruction and generate address information for the instruction as provided in the decoder 109 and the address generator 112 shown in FIG. 2A (Block 301).

The next step involves detecting whether data from the cache will be needed to process the decoded instruction (Block 302). If data will be needed, then the apparatus shown in FIGS. 2A and 2B generates the storage unit operation required signal on line 119.

The next step is to determine whether it is the first cycle of an interlock (Block 303). If it is, then the first A-Cycle signal is generated on line 120 in the apparatus shown in FIGS. 2A and 2B. Of course, this first cycle could be any cycle of the interlock as it suits a particular implementation.

If it is the first cycle of the interlock, then the priority of the address information from the decoded instruction is increased so that work will be initiated if needed in the storage unit to make the requested data available in the storage unit for subsequent access (Block 304). The next step involves preventing the supply of data from the storage unit from work initiated during the interlock on the interlocked instruction (Block 305). This is accomplished in the apparatus of FIGS. 2A and 2B by the staged prefetch signal on line 228.

If it is not the first cycle of the interlock, then the process proceeds to wait for release of the interlock (Block 306). Further, after initiating the work, if needed, and preventing the supply of data from steps in Blocks 304 and 305, the algorithm proceeds to the wait for release of interlock Block 306. Finally, when the interlock is released, the cache access is initiated and the data is retrieved (Block 307). In the preferred embodiment, an interlock release signal is generated as indicated by the A-Cycle release signal on line 123 in the embodiment shown in FIGS. 2A and 2B. In response to the A-Cycle release signal, the prefetch signal is staged through the storage unit along with the address information from the interlocked instruction.

Although the preferred implementation has been shown with the storage unit implemented in pipeline fashion, the present invention applies as well to queue designed storage units.

The foregoing description of the preferred embodiment of the present invention has been presented for the purposes of illustration and description. It is not intended to be exhaustive or to limit the invention to the precise form disclosed. Obviously many modifications and variations will be apparent to practitioners skilled in the art. The embodiment was chosen and described in order to best explain the principles of the invention in its practical application, thereby enabling others skilled in the art to understand the invention for various embodiments and with various modifications as are suited to the particular use contemplated. It is intended that the scope of the invention be defined by the following claims and their equivalents.

We claim:

1. In a data processing system including an instruction unit, a main store storing system data, and a storage unit having a high speed cache storing a subset of the data retrieved from the main store, the instruction unit including a first register receiving instructions including address information in a pipeline fashion and subject to interlocks in which an interlocked instruction held in the first register is prevented from advancing in the pipeline during one or more cycles, the storage unit including at least a first port for holding address information, and cache management logic for managing cache access in response to address information, and further including a selector for selecting address information from the first port in the storage unit or from the first register in the instruction unit for supply to the cache management logic, and selector control logic for assigning priority to the first port and the first register to control the selector in response to the assigned priorities, an apparatus for improving storage unit utilization during interlocks, comprising:
means, coupled to the first register, for generating a control signal during one cycle of an interlock if the interlocked instruction may require cache access; and
means, responsive to the control signal and coupled to the selector control logic, for changing the assigned priority of the first register.

2. The apparatus of claim 1, further including:
means, responsive to the control signal and the assigned priority, for generating a prefetch signal indicating that address information from an interlocked instruction is being processed.

3. The apparatus of claim 1, wherein said means for changing the priority of the first register assigns the highest priority to the first register in response to the control signal resulting in supply of the address information from the first register to the cache management logic.

4. The apparatus of claim 2, further including:
means, coupled to the cache management logic, for signalling the instruction unit when the cache management logic retrieves valid data from the high speed cache; and
means, responsive to the prefetch signal, for disabling the means for signalling the instruction unit.

5. The apparatus of claim 1, wherein the one cycle of an interlock in which the control signal is generated is the first cycle.

6. The apparatus of claim 1, wherein said instruction unit further includes:
means for generating an interlock release signal when the interlocked instruction is released in the pipeline; and
the selector control logic includes means responsive to the interlock release signal, for changing the assigned priority of the first register.

7. The apparatus of claim 1, wherein the cache management logic includes;
means, responsive to selected address information, for detecting whether the data identified by the selected address information is available in the cache; and
means for retrieving data from main store when the data is unavailable.

8. The apparatus of claim 7, wherein the selected address information includes a virtual address that requires a valid address translation for cache access and the cache management logic further includes:
means, responsive to selected address information, for detecting whether a valid address translation is present in the storage unit for the selected address information; and
means for generating a valid address translation when a valid address translation is not present in the storage unit.

9. In a data processing system including an instruction unit, a main source storing system data, and a storage unit having a high speed cache storing a subset of the data retrieved from the main store, the instruction unit including a first register receiving instruction including address information in a pipeline fashion and subject to interlocks in which an interlocked instruction held in the first register is prevented from advancing in the pipeline during one or more cycles, the storage unit including at least a first port for holding address information, and cache management logic for managing cache access in response to address information, and further including a selector for selecting address information from the first port in the storage unit or from the first register in the instruction unit for supply to the cache management logic, and selector control logic for assigning priority to the first port and the first register to control the selector according to the assigned priorities, a method for improving storage unit utilization during interlocks, comprising the steps of:
detecting whether the interlocked instruction will require cache access during one cycle of the interlock;
if the interlocked instruction will require cache access, then changing the assigned priority of the first register for supply of address information from the interlocked instruction to cache management logic during the one cycle of the interlock.

10. The method of claim 9, further including the step of:
generating a prefetch signal indicating that address information from an interlocked instruction is being processed.

11. The method of claim 10, further including the step of:
preventing the cache management logic from supplying data to the instruction unit in response to the prefetch signal.

12. The method of claim 9, wherein the step of changing the priority of the first register assigns the highest priority to the first register resulting in supply of the address information from the first register to the cache management logic.

13. The method of claim 9, wherein the one cycle of an interlock is the first cycle.

14. The method of claim 9, further including the steps of:
generating an interlock release signal when the interlocked instruction is released in the pipeline; and
changing the priority of the first register in response to the interlock release signal.

15. A data processing apparatus for processing data in response to a program of instructions in clock cycles, the program of instructions including a plurality of operand-accessing instructions, the operand-accessing instructions including operand addresses identifying requested data, the apparatus comprising:

an instruction unit including an instruction pipeline having a plurality of pipeline stages, each given pipeline stage including logic asserting a stage release signal signalling completion of processing in the given pipeline stage, the instruction unit staging the program of instructions through the instruction pipeline to control execution of the program in response to the clock cycles and the stage release signals from the plurality of pipeline stages, wherein the instruction pipeline is interlocked when all stage release signals are not asserted in one clock cycle;

means, connected to one pipeline stage of the plurality of pipeline stages, for generating an operand request signal in a first clock cycle indicating presence of one of the plurality of operand-accessing instructions in the one pipeline stage during the first clock cycle;

means, connected to receive the stage release signal from the one pipeline stage, and the operand request signal, for generating a selector control signal; and a storage unit including a high speed cache storing data at locations identified by addresses, a plurality of ports for supplying addresses identifying requested data, means, receiving the selector control signal and connected to the plurality of ports and the one pipeline stage, for selecting an address from one of the plurality of ports or from the one pipeline stage for access to the high speed cache in response to the selector control signal, so that the address from the one pipeline stage is selected by the means for selecting upon assertion of the operand request signal when the instruction pipeline is interlocked while one of the plurality of operand-accessing instructions is present in the one pipeline stage, and upon assertion of the stage release signal for the one pipeline stage while one of the plurality of operand-accessing instructions is present in the one pipeline stage.

16. The apparatus of claim 15, wherein the storage unit includes means for signalling the instruction unit when data present in the high speed cache in a location identified by address information from the one pipeline stage is valid, and means for fetching valid data for an accessed location if the data present is not valid; and wherein the apparatus further includes means, connected to receive the selector control signal, for asserting a prefetch signal when an address from the one pipeline stage is selected while the instruction pipeline is interlocked;

means, connected to receive the prefetch signal, for disabling the means for signalling the instruction unit.

* * * * *